United States Patent [19]

Wike, Jr. et al.

[11] Patent Number: 4,971,410
[45] Date of Patent: Nov. 20, 1990

[54] SCANNING AND COLLECTION SYSTEM FOR A COMPACT LASER

[75] Inventors: Charles K. Wike, Jr., Ithaca, N.Y.; Rex A. Aleshire, Byesville, Ohio

[73] Assignee: NCR Corporation, Dayton, Ohio

[21] Appl. No.: 386,377

[22] Filed: Jul. 27, 1989

[51] Int. Cl.$^5$ ............................................. G02B 26/08
[52] U.S. Cl. ................................... 350/6.5; 235/467; 235/472; 250/566; 250/568
[58] Field of Search ........................ 350/3.71, 6.1, 6.2, 350/6.4, 6.5, 6.7, 6.9, 6.91; 235/454, 457, 462, 467, 472; 250/236, 566, 568

[56] References Cited

U.S. PATENT DOCUMENTS

| | | | |
|---|---|---|---|
| 3,414,731 | 12/1968 | Sperry | 250/219 |
| 3,632,871 | 1/1972 | Watkins | 178/7.6 |
| 3,663,800 | 5/1972 | Myer et al. | 235/61.11 E |
| 3,716,699 | 2/1973 | Eckert, Jr. et al. | 235/61.11 E |
| 3,718,761 | 2/1973 | Myer | 178/7.6 |
| 3,806,706 | 4/1974 | Hasslinger et al. | 235/61.11 E |
| 3,812,374 | 5/1974 | Tuhro | 250/568 |
| 3,931,524 | 1/1976 | Herrin | 250/566 |
| 3,978,317 | 8/1976 | Yamaguchi et al. | 235/61.11 E |
| 4,037,920 | 7/1977 | Runciman et al. | 350/7 |
| 4,057,784 | 11/1977 | Tafoya | 340/146.3 F |
| 4,282,431 | 8/1981 | Anthony, Jr. et al. | 250/236 |
| 4,409,469 | 10/1983 | Yasuda et al. | 235/462 |
| 4,409,478 | 10/1983 | Libby | 350/6.9 |
| 4,418,276 | 11/1983 | Yatsunami | 235/462 |
| 4,427,878 | 1/1984 | Buchtel et al. | 250/203 R |
| 4,652,732 | 3/1987 | Nickl | 235/462 |
| 4,654,518 | 3/1987 | Astheimer | 250/236 |
| 4,678,288 | 7/1987 | Lonsdale et al. | 235/472 |
| 4,694,182 | 9/1987 | Howard | 235/462 |
| 4,699,447 | 10/1987 | Howard | 350/6.7 |
| 4,795,224 | 1/1989 | Goto | 250/236 |
| 4,825,057 | 4/1989 | Swartz et al. | 235/472 |
| 4,852,956 | 8/1989 | Yramer | 350/3.71 |
| 4,870,274 | 9/1989 | Hebert et al. | |
| 4,938,551 | 7/1990 | Matsumoto | 350/6.7 |

Primary Examiner—Bruce Y. Arnold
Assistant Examiner—J. P. Ryan
Attorney, Agent, or Firm—Wilbert Hawk, Jr.; Albert L. Sessler, Jr.; Richard W. Lavin

[57] ABSTRACT

A self-contained optical scanning unit for use in a bar code scanner includes a motor driven hollow drive shaft through which is projected a laser light beam from a laser source positioned adjacent one end of the drive shaft. Mounted on the other end of the drive shaft is an optical transceiver which includes a deflecting portion which deflects the laser light beam outwardly towards a ring of mirrors which forms a scanning pattern for scanning a coded indicia and a collection portion which collects the reflected light beams from the coded indicia and directs the light beams at a detecting member. The collection portion of the transceiver is orientated obliquely across the spin axis of the drive shaft while the deflection portion is oriented obliquely to the spin axis and to the face of the collection portion. The detection member is located on the spin axis between the transceiver and the coded indicia.

41 Claims, 10 Drawing Sheets

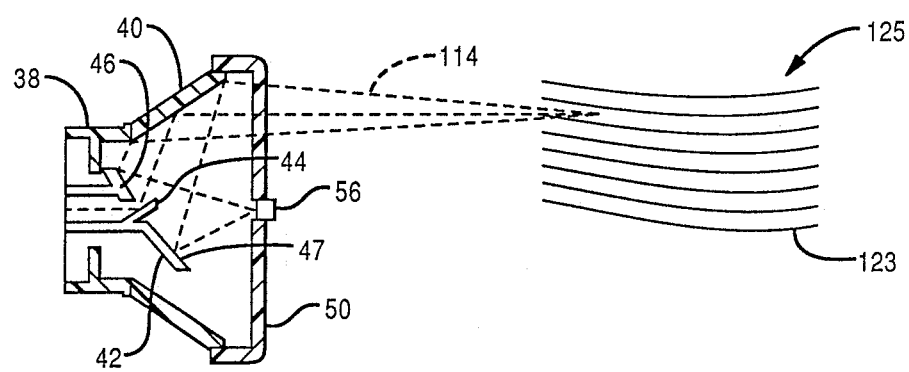
FIG. 10
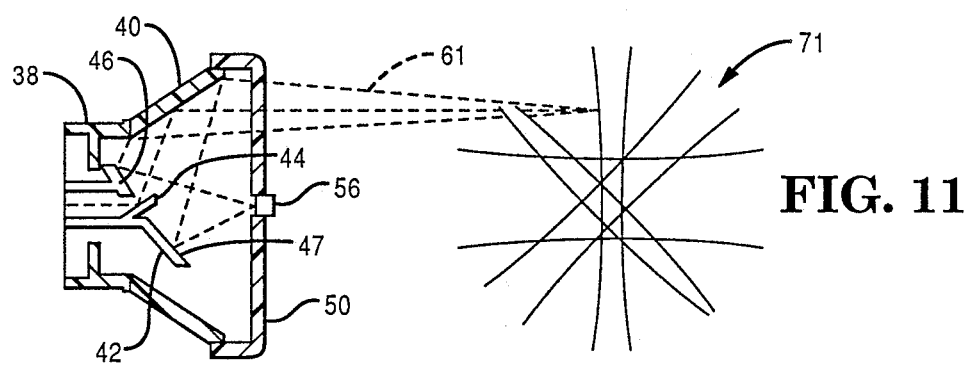
FIG. 11
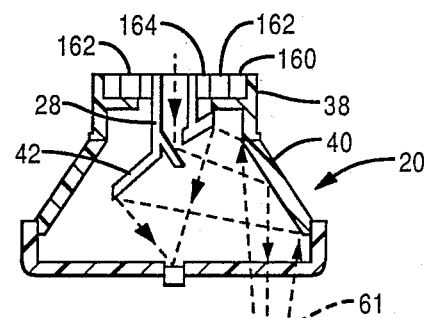
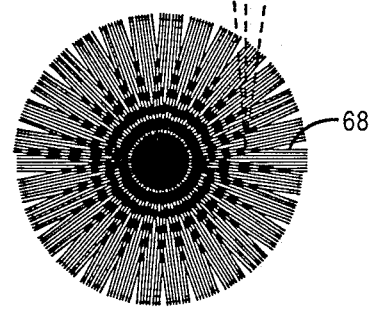
FIG. 12

SCANNING AND COLLECTION SYSTEM FOR A COMPACT LASER

BACKGROUND OF THE INVENTION

The invention relates to optical scanning devices and more particularly to a portable scanning device for generating a plurality of scanning light beams for scanning a coded label and for collecting the reflected light beams.

In present-day merchandising point-of-sale checkout systems, data pertaining to the purchase of a merchandise item is obtained by reading data encoded indicia such as a bar code label printed on or attached to the purchased merchandise item. In order to standardize the bar codes used in various point-of-sale checkout systems, the grocery industry has adopted a uniform product code (UPC) which is in the form of a bar code. Reading systems which have been constructed to read this type of bar code include stationary optical scanning systems normally located within the cabinet structure of a checkout counter. The bar code is read when a purchased merchandise item is moved across a window in the counter constituting the scanning area of the counter.

Other reading systems employ hand-held laser scanners which emit a single or multiple line scan pattern and which are manually moved past the bar code label that is to be read. It is desirable that handheld laser scanners should provide a high performance scanning operation and have a light weight, compact and balanced hand-held construction. The construction should further provide for ease of movement and reduced hand fatigue in the handling of the scanner and be easily disassembled for testing and for replacement of parts. It is further desirable to have a compact scanner assembly which combines the performance of a stationary scanner with the size, weight, portability, ruggedness and ease of operation of a hand-held scanner.

In order to provide some of these design features, prior bar code scanners or scan generators have utilized a motor-driven hollow drive shaft through which a scanning light beam is projected and then deflected outwardly by a mirror mounted on the end of the shaft. The deflected light beam strikes a plurality of mirrors mounted to deflect the light beam in a forward direction forming a scanning pattern which is moved across a coded label in a reading operation. Examples of this type of bar code scanner construction include U.S. Pat. No. 3,978,317, which discloses an optical reader including a plurality of fixed mirrors disposed on an imaginary circumference, a light source for projecting a light beam through a rotating hollow shaft, a mirror mounted on the end of the hollow shaft for receiving the light beam from the light source and for directing the reflected light beam to the plurality of fixed mirrors successively so as to form a plurality of scanning light beams which are projected on an object, and a photodetector mounted between the rotating mirror and the object for receiving the light beams reflected by the object and for generating an electrical signal in response to receiving the reflected light beams.

In U.S. Pat. No. 4,639,070, there is disclosed a hand-held laser bar code scanning device which includes a basket-shaped array of mirrors which may rotate or be held stationary. Different scan patterns are generated by giving different angles to the mirrors. A rotating hologram is used to generate a conical beam sweep.

In U.S. Pat. No. 4,672,400, there is disclosed a laser scanning device for optically switching an electrostatic printer. The device includes a hollow spindle which is part of the armature of the drive motor. A laser beam is directed through the rotating spindle and folded by an oblique mirror secured to the spindle, to generate a circular sweep. A laser diode may be used as the light source and a focusing lens is fixed within the spindle. The reference discloses the use of directing the beam along the beam axis.

In U.S. Pat. No. 4,699,447, there is disclosed a scanning device for producing a plurality of scan lines including a housing for connection to a beam generator projecting a beam along a beam axis, with a deflecting mirror mounted in the housing obliquely with respect to the beam axis so as to intercept and fold the beam radially outwardly from the beam axis. A plurality of mirrors are disposed outwardly with respect to the beam axis, with each mirror orientated on a tilt angle with respect to the beam axis with the mirrors arranged in a generally basket-shaped array. Each mirror of the basket-shaped array is orientated in such a manner that when it receives a folded beam, it redirects the beam generally in the direction of the beam axis. Rotational drive means are operatively connected to the deflecting mirror or to the basket-shaped array of mirrors for permitting relative rotation of the mirror array and the deflecting mirror about the beam axis. In one embodiment, the basket-shaped array of mirrors is held stationary while the deflecting mirror on the beam axis is rotated. In another embodiment, the basket-shaped array of mirrors is rotated but the deflecting mirror is held stationary. The light beams reflected from the mirrors in the basket-shaped array are directed to form a scan pattern comprising a plurality of scan lines.

SUMMARY OF THE INVENTION

In accordance with one embodiment of the invention, there is provided a scanning device which may be mounted in a portable hand-held scanner comprising a housing member including a handle portion and a body portion within which is mounted a compact scanning and collecting unit having a spin axis for projecting a scanning pattern at predetermined distances from the front edge of the scanning unit. The scanning unit includes a motor for rotating a hollow drive shaft through 360 degrees about a spin axis which extends through the motor. Mounted adjacent one end of the drive shaft is a laser which projects a laser light beam along the spin axis through the shaft. Mounted on the other end of the shaft is an optical transceiver comprising a deflecting portion positioned obliquely across the spin axis of the shaft for deflecting or folding the laser light beam outwardly towards a ring of pattern mirrors. Each of the pattern mirrors is molded offset to each of the other pattern mirrors. The optical transceiver has a collection portion having an aspherically formed concave surface extending transversely across the opening of the drive shaft and includes an aperture portion in which is mounted the deflecting portion at an oblique angle to the concave surface of the collection mirror portion. The pattern mirrors form the limiting aperture of the optical system, i.e., the surface area of each of the pattern mirrors used for collecting the light reflected from the scanned object is less than that of the surface area of the collection portion of the optical transceiver. The width of the collecting surface of the collection portion of the transceiver of the present invention is approximately twice that of the collection surface of each of the pattern mirrors thereby providing full signal collection by the collection portion at the end of the scan lines. Rotation of the drive shaft results in the deflecting portion deflecting the laser light beam at the ring of pattern mirrors which in turn deflects the light beam at a focal plane forming a scan pattern for scanning a coded label located in the focal plane.

The light beams reflected from the coded label are directed at the optical transceiver and are collected by the collection portion of the optical transceiver which redirects the collected light beams at a photodetector positioned on the spin axis upstream of the collection portion. The photodetector is mounted in a plastic cover member which covers the opening of the scanning unit. The receiving area of the collection portion together with the size of the receiving area of the photodetector controls the amount of light beams striking the photodetector as the distance of the bar code label from the scanning unit varies.

In another embodiment of the invention, the ring of pattern mirrors is mounted for rotational movement in a direction opposite to the rotational movement of the drive shaft, thus producing a scanning pattern having a large number of intersecting parallel scan lines.

In still another embodiment of the invention, the optical transceiver comprises a solid piece of plastic having a recessed surface forming an internal deflecting surface which deflects the received light beam towards the ring of mirrors. The motor structure includes a plurality of Hall sensor members for use in selectively controlling the on-off operation of the laser diode with respect to the rotation of the drive shaft enabling the optical transceiver to generate a scan pattern consisting of any number of individual scan lines. The Hall sensors may also be used to limit the rotational movement of the motor to dither the movement of the motor producing a scan pattern consisting of any number of parallel scan lines. Switch means mounted on the body portion control the operation of this feature while actuating means on the handle portion control the operation of the scanning unit.

It is therefore a principal object of this invention to provide a compact, light weight, portable scanner for generating a highly efficient multi-line scan pattern.

It is another object of this invention to optimize the scanning volume of the scanning unit to both generate a scanning pattern and to collect the scattered light reflected from the scanned object, thus utilizing fully the scanning volume of the scanning unit.

It is another object of this invention to provide a one piece optical transceiver which includes reflecting surfaces for deflecting a laser light beam to form a scanning pattern and to collect the reflected light beams.

It is a further object of this invention to provide an optical transceiver for use in a portable scanner which is of one piece construction having a low inertia and which is rotationally invariant with respect to its light collecting characteristics.

It is another object of this invention to provide an optical transceiver for use in a portable scanner for collecting scattered reflected light beams from a scanned bar code label which automatically controls the amount of light striking a photodetector as the distance between the coded label and the scanning unit varies producing a scanning unit with a self-limiting dynamic range.

It is another object of this invention to provide a scanning unit which may be used in any type of scanning packaging.

It is a further object of this invention to provide an optical transceiver for collecting reflected light beams from a scanned coded label which is simple in construction and low in cost.

It is another object of this invention to provide an optical transceiver for collecting reflected light beams in which the optical transceiver is rotated 360 degrees.

It is a further object of this invention to provide a scanning system in which each of the pattern mirrors has the smallest optical surfaces of the light collecting system.

BRIEF DESCRIPTION OF THE DRAWINGS

These and other objects, features and advantages of the invention, as well as the invention itself, will become more apparent to those skilled in the art in light of the following detailed description taken in consideration with the accompanying drawings wherein like reference numerals indicate like or corresponding parts throughout the several views in which:

FIG. 10 shows the scan pattern generated by both embodiments of the bar code scanner unit of the present invention when only the pattern mirrors are rotated or the optical transceiver is rotated less than 360 degrees;

FIG. 11 illustrates the scan pattern generated by one embodiment of the hand-held bar code scanner of the present invention when the optical transceiver is rotated while the ring of pattern mirrors is stationary;

FIG. 12 illustrates the scan pattern generated when the ring of mirrors and the optical transceiver are both rotated but in opposite directions;

DESCRIPTION OF THE PREFERRED EMBODIMENT

Figure 1:
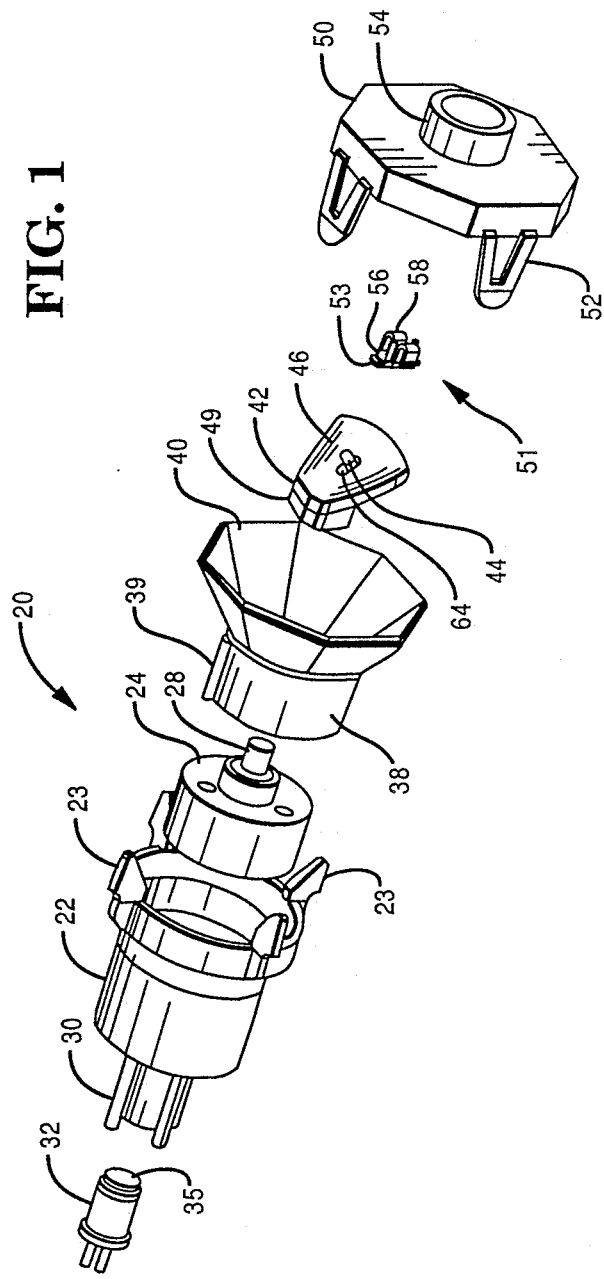
FIG. 1 is an exploded view of the scanning unit used in one embodiment of a bar code scanner of the present invention showing the elements which generate a scanning pattern including the optical transceiver for collecting the reflected light beams from the scanned coded label and the photodetector which receives the reflected light beams from the transceiver.
Figure 2:
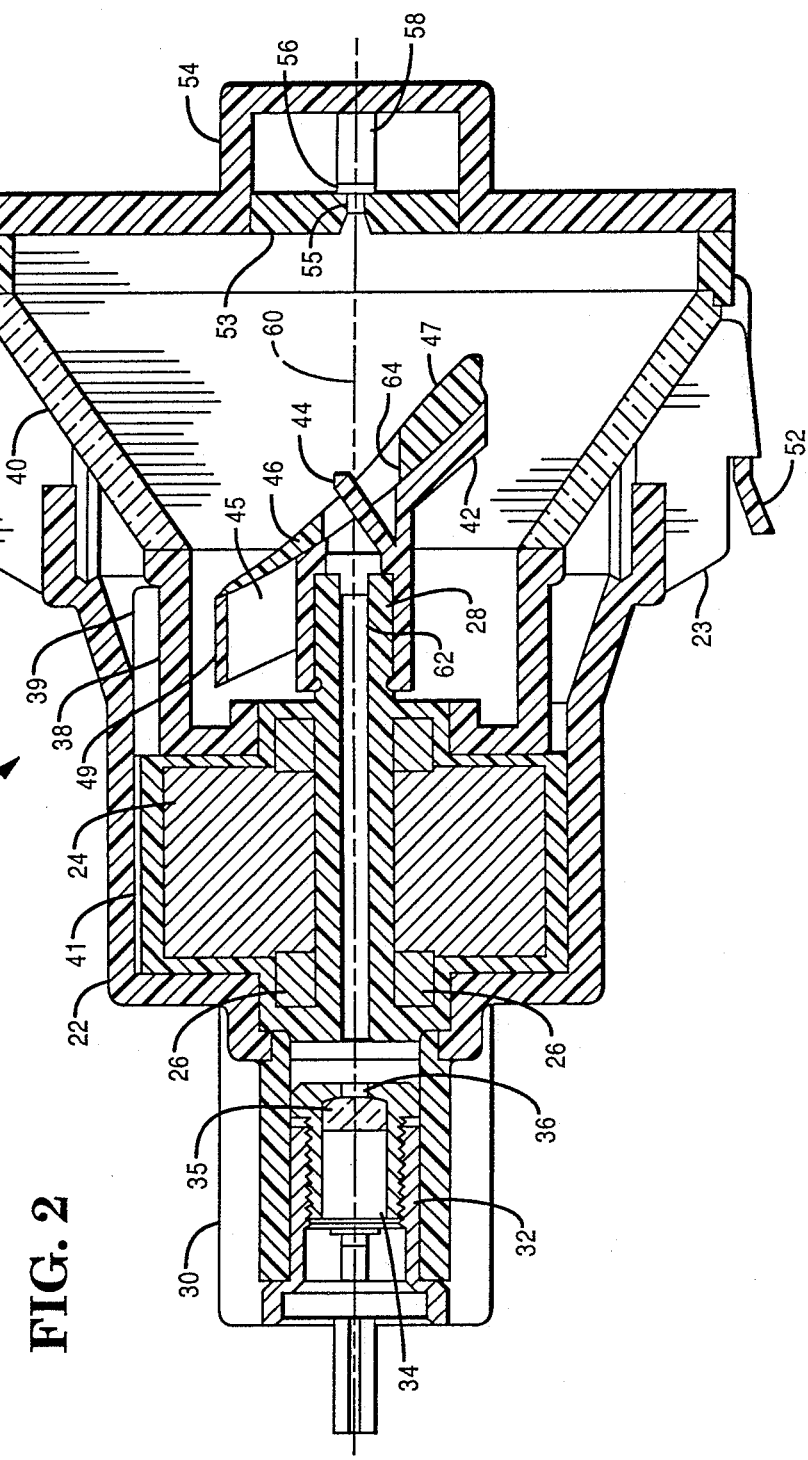
FIG. 2 is a sectional side view of the scanning unit shown in FIG. 1.

Referring to the drawings, FIG. 1 is an exploded perspective view of the scanning unit in which the presently preferred embodiment of the invention is incorporated while FIG. 2 is a cross sectional view of the assembled scanning unit. As shown in those figures, the scanning unit generally indicated by the numeral 20 includes a molded frame support member 22 having a plurality of latching portions 23. The frame support member 22 may be molded of any type of shock resistant plastic material such as polycarbonate. Mounted within the support member 22 is a motor 24. Journaled within the motor by bearings 26 (FIG. 2) is a hollow drive shaft 28 extending through the motor 24. Mounted within a rear extension portion 30 of the frame support member 22 is a brass laser diode support member 32 supporting a laser diode 34 (FIG. 2) and a collimating and focusing lens member 35 both of which are in alignment with the spin axis 60 of the drive shaft 28. The diode 34 outputs a diverging light beam which is collimated and focused on a reference plane (not shown) in front of the scanning unit by the lens member 35. A circular aperture stop 36 (FIG. 2) positioned adjacent the lens member 35 has a cross-section which is smaller than the lens member 35 for controlling the size of the laser light beam projected at the reference plane in a manner that is well known in the art.

Slidably mounted within the frame support member 22 is a molded mirror support member 38 constructed of any type of polycarbonate plastic which includes a plurality of acrylic turning or pattern mirrors 40, each of which extends outwardly from the support member 38 at an angle of approximately thirty-three degrees and in which each mirror is offset to each of the other mirrors 40 by approximately three degrees. The number of mirrors employed is controlled by the number of scan lines required for the scan pattern. In the scanning unit 20, there are eight turning mirrors. The mirrors have their reflecting surfaces coated with gold. The support member 38 includes a rearwardly extending key rib portion 39 which is positioned within a key slot 41 (FIG. 2) located in the frame support member 22 for snap fitting the support member 38 within the support member 22. Secured to the front end of the drive shaft 28 is one embodiment of an optical transceiver 42 of the present invention comprising a flat deflecting mirror portion 44 which, as shown in FIG. 2, extends obliquely across the spin axis 60 of the drive shaft 28 and a collection mirror portion 46 which, as will be described more fully hereinafter, comprises a sloping aspheric concave surface 47 for collecting the scanning light beams reflected from a scanned bar code label. The optical transceiver 42 may be snap fitted over the shaft 28 and may be molded of any type of transparent material such as a polycarbonate plastic material. The reflecting surfaces of the transceiver 42 are coated with gold which reflects the red light band while allowing all other bands of light to pass through the surface of the transceiver. In order to reduce the noise generated by the stray light passing through the transceiver, the rear surfaces of the transceiver may be coated with silicon oxide which absorbes the light.

As seen in FIGS. 1-4 inclusive, the deflecting mirror portion 44 extends through a slot 64 in the collecting surface 47 of the collection mirror portion 46. The mirror portion is orientated at an oblique angle to the surface 47. The transceiver 42 includes a rear portion 49 which includes a plurality of depending rib portions 45 which provides a balance to the transceiver when rotated about the spin axis. Mounted to the front portion of the mirror support member 38 is a transparent acrylic photodetector support member 50, having a plurality of flexible finger members 52 which snap over the latching portions 23 of the frame support member 22 for holding the photodetector support member 50 to the mirror support member 38. Coating the reflecting surfaces of the mirrors 40 and the transceiver 42 with gold together with the use of the acrylic support member 50 provides high reflectivity and transmission of light. Mounted within a protruding housing portion 54 of the support member 50 is a detector assembly generally indicated by the numeral 51 (FIG. 1) comprising a support member 53 having a limiting aperture 55 (FIG. 2) and a photodetector 56 secured to the member 53 and mounted within a holder 58 secured to the inside end portion of the housing portion 54.

The operation of the laser diode 34 will output a narrow laser light beam along the spin axis 60 of the scanning unit 20 (FIG. 2). The laser light beam will travel through the bore 62 located in the drive shaft 28 where it impacts on the rotating deflecting mirror portion 44 of the optical transceiver 42. The light beam designated as 61 (FIG. 11) will be deflected radially outwardly by the deflecting mirror portion 44 to impact on the turning mirrors 40 which in turn deflect the light beam in a forward direction through the acrylic support member 50 forming a scanning pattern 71 (FIG. 11) for scanning a coded bar code label(not shown). The scattered light beams reflected from the scanned bar code label are redirected by the turning mirrors 40 towards the collection mirror portion 46 whose concave surface 47 reflects the light beams at the photodetector 56 positioned on the spin axis 60, which converts the received light beams into electrical signals in a manner that is well known in the art.

Figure 3:
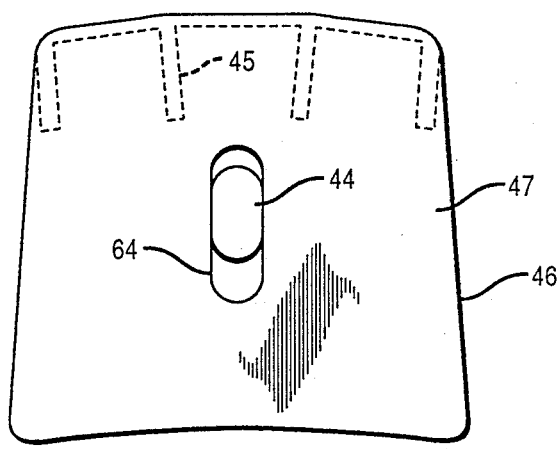
FIG. 3 is a front view of the optical transceiver utilized in the scanning unit of FIG. 1 showing the location of the aperture in which is located the deflecting mirror portion of the transceiver.
Figure 4:
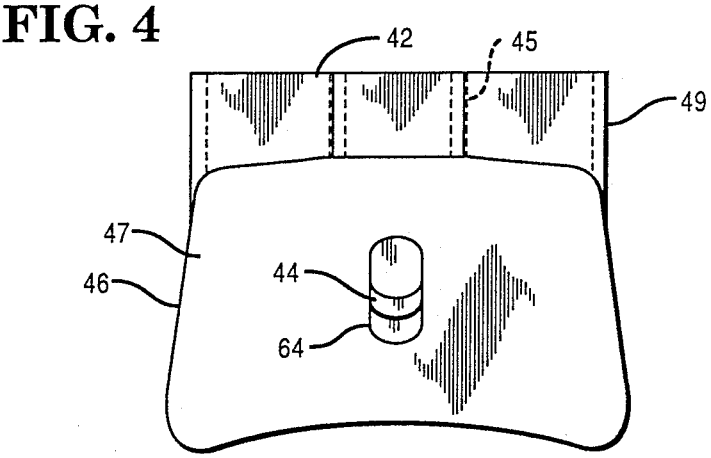
FIG. 4 is a top view of the optical transceiver of FIG. 3.

As shown in FIGS. 3 and 4, the collection portion 46 of the optical transceiver 42 is molded in a trapezoidal shape having a concave configuration along its shortest axis and an aspherical concave configuration along its longest axis (FIG. 1). In order to provide a highly efficient bar code code scanner having a small configuration, the surface area of the collection mirror portion 46 is greater than the reflecting surface of each of the mirrors 40 making the mirrors the limiting aperture of the scanner. In the present embodiment, the reflecting surface area of the collection portion 46 of the transceiver is approximately twice the area of each of the turning mirrors 40 enabling the mirror portion 46 to collect the majority of the reflected light beams deflected from the mirrors 40 at the end of the scan pattern.

Figure 5:
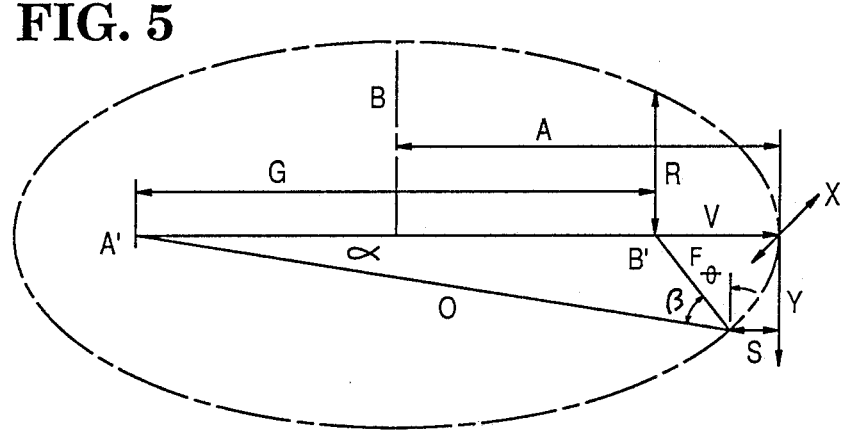
FIG. 5 is a diagram illustrating the design parameters for developing the aspherical light collecting surface of the optical transceivers found in both embodiments of the present invention.

Referring to FIG. 5, there is shown a diagram illustrating the design parameters for developing the aspherical light collecting surface of the optical transceivers disclosed in the present embodiment. To generate the aspherical surface 63 (FIG. 6), the following equations are used.

$$S(sag) = 1/K + 1\ R - \sqrt{R^2 - (x^2 + Ky^2 + y^2 + Ky^2)} \quad (1)$$

$$S(sag) = 1/K + 1[R - \sqrt{R^2 - (K + 1)S^2}\ ] \quad (2)$$

$$\text{where } R = V(K + 1)/(1 - \sqrt{-K})$$

$K$(conic constant)$= -E^2$
$V = (2A - G)/2$ $$E(\text{eccentricity}) = \sqrt{A^2 - B^2}\ /A$$

$$\beta = \sqrt{A^2 - (G/2)^2}$$

$A = (O - F)/2$
$G = (O - F\cos\beta)/\cos\alpha$
$y = F\cos\theta$
$\theta = 90 - \beta - \alpha$
$\alpha = \tan^{-1}(F\sin\beta/0 - (F\cos\beta)$ In the present embodiment, F(focal point) is 0.75 inches, O(object distance) is 12 inches and $\beta$ is 70 degrees.

Figure 6:
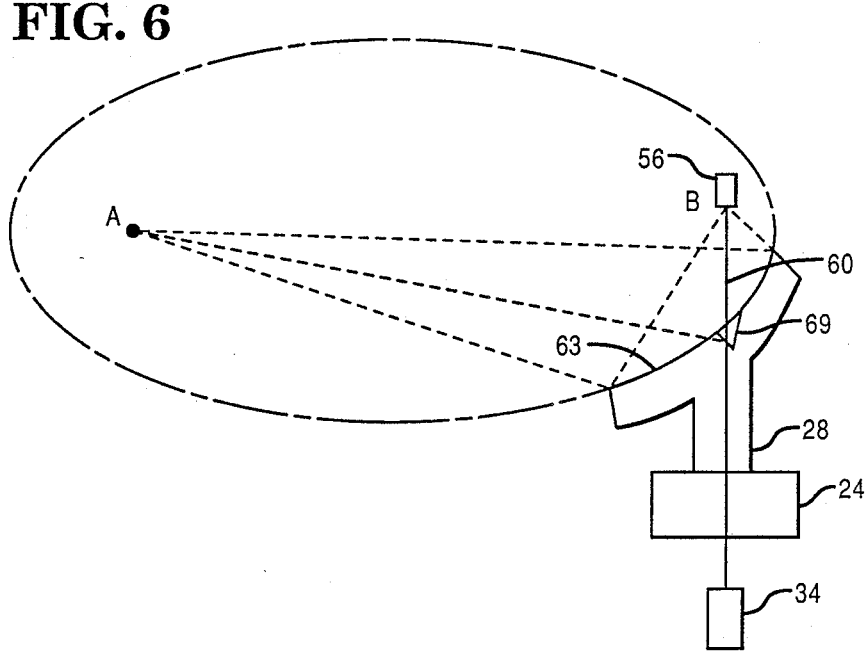
FIG. 6 is a diagram illustrating the location of the spin axis and the photodetector with respect to the focal points of the aspherical light collecting surface of the optical transceivers of the present invention.

Referring to FIG. 6, there is shown a diagram of a second embodiment 67 of the optical transceiver 42 (FIGS. 1 and 2) illustrating the location of the focal points of the aspherical light collecting surface of both optical transceivers. The transceiver 67 has a aspherical concave surface 63 along its longest axis the same as the surface 47 of the transceiver 42 and comprises the collection portion 65 of the transceiver. The transceiver 67 has a recessed surface portion 69 comprising the deflection portion. The concave surface 63 has two focal points, A and B, with the B focal point being on the spin axis 60 of the bar code scanner while the A focal point locates the focal plane at which the recessed portion 69 will deflect the light beams 73. The turning mirrors 40 (FIG. 1) may be located at any location along the line to the focal point A from the transceiver.

Figure 7:
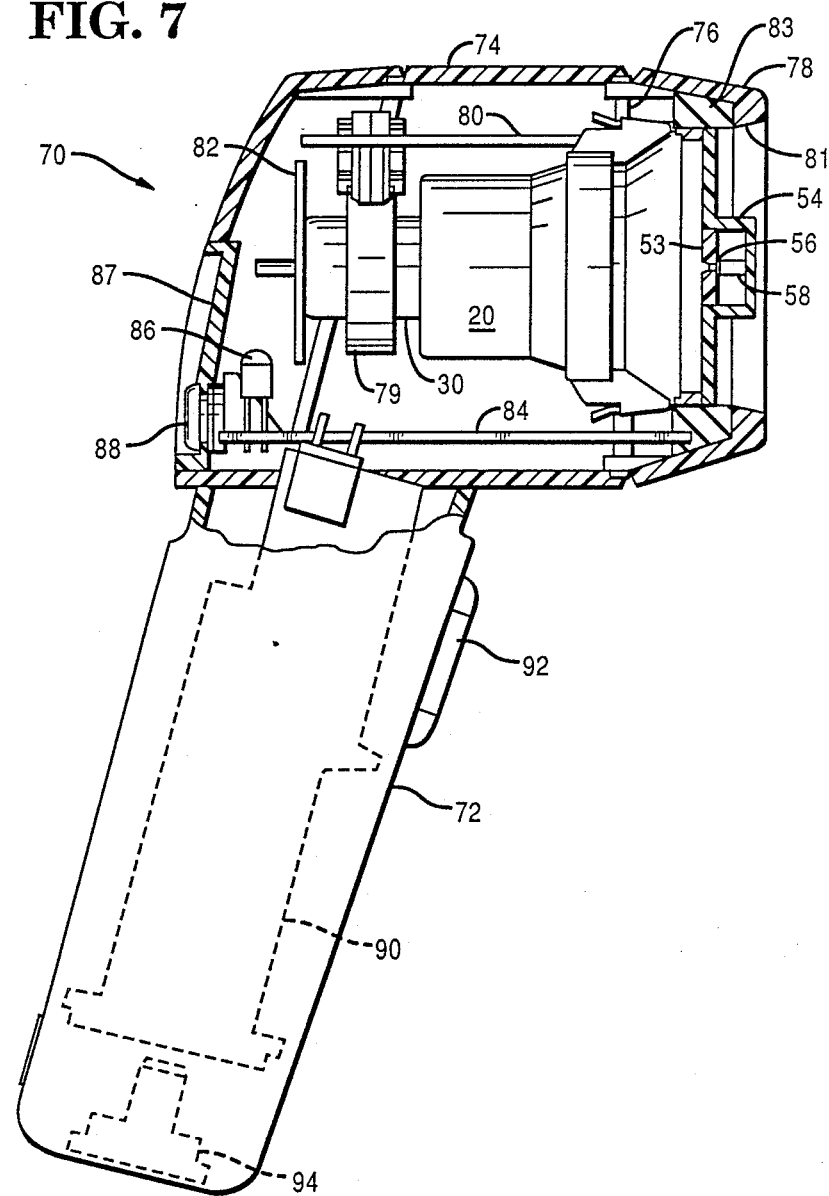
FIG. 7 is a partial side view of one embodiment of a hand-held bar code scanner of the present invention employing the scanning unit of FIG. 1 with a portion of the body portion removed showing the location of the scanning elements within the body portion of the scanner.

Referring now to FIG. 7, there is shown a side view of one embodiment of a hand-held laser scanner incorporating the scanning unit 20 (FIGS. 1 and 2) of the present invention with a portion of the body portion removed for clarity. As shown, the handheld scanner generally indicated by the numeral 70 comprises a handle portion 72 and a main body portion 74. The scanning unit 20 is mounted within the main body portion 74 by means of a support ring 76 which in addition to supporting the scanning unit 20 also supports a cover member 78 having an opening 81 in which is positioned the housing portion 54 of the support member 50 containing the photodetector 56 and the holder 58 (FIGS. 1 and 2). The cover member 78 may be constructed of a transparent material such as acrylic and is shock mounted with respect to the support member 50 by means of a ring of elastic form material 83. Slidably mounted on the extension portion member 30 is a bracket member 79 supporting a printed circuit board 80 which contains the video circuits associated with the operation of the scanning unit. The bracket member 79 may be constructed of a hard plastic material such as polycarbonate.

Positioned on the extension portion 30 is a printed circuit board 82 containing the laser drive circuits for the laser diode 34 (FIG. 2). The board is secured to the laser support member 32 which, when inserted into the extension portion 30 of the support member 22 (FIG. 1), is supported thereby. Mounted along the lower edge of the main body portion 74 is a printed circuit board 84 which contains the digital interface logic circuits for controlling the processing of digital signals generated as a result of the operation of the scanning unit.

Secured to the printed circuit board 84 is a light emitting diode 86 for use in indicating the occurrence of a good read operation by the scanning unit in a manner that is well known in the art. The diode 86 can be viewed through a transparent member 87 mounted in the rear surface of the main body portion 74. A depressible button member 88 located in the rear edge of the main body portion 74 controls the operation of the laser diode 34 (FIG. 1) to output light beams designated as 61 (FIG. 11) to generate a scan pattern similar to the scan pattern designated as 125 in FIG. 10 composed of parallel scan lines 123. This operation utilizes Hall sensors (not shown) similar to the Hall sensors 122 shown in FIG. 8 for generating signals indicating the position of the shaft 28 (FIG. 2) in a manner that is well known in the art.

Also secured to the printed circuit board 84 is a circuit board 90 located in the handle portion 72 of the scanner and which controls the power supplied to the scanning unit 20. A button mechanism 92 located along the forward edge of the handle portion 72 is connected to the printed circuit board 90 to provide an on/off operation of the scanning unit. Located in the lower edge of the handle portion 72 is a recessed plug portion 94 for receiving a cable (not shown) which supplies power to the scanner and also transmits electrical signals outputted by a microprocessor (not shown) located on the printed circuit board 84, representing the data signals generated as a result of scanning the bar code label.

Figure 8:
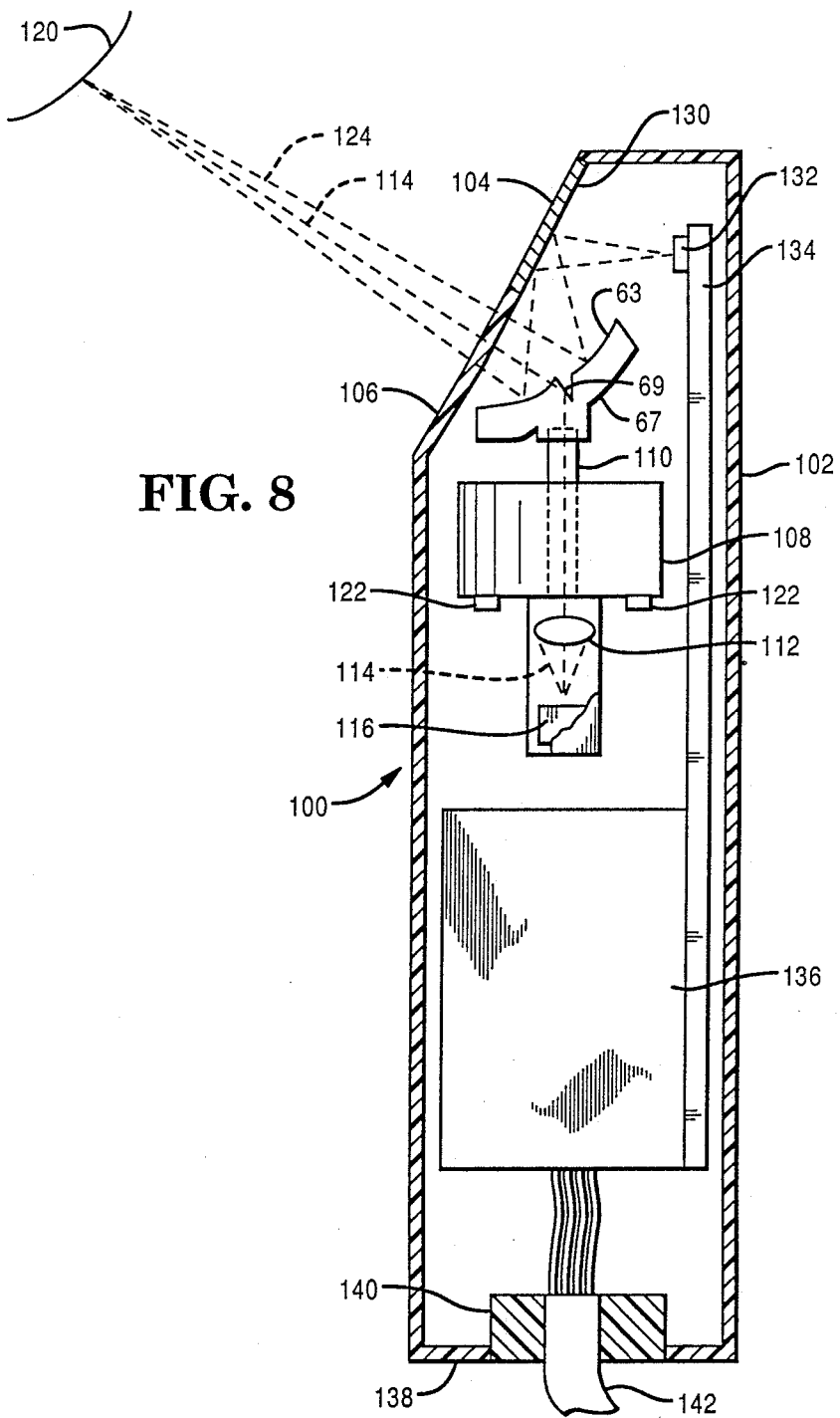
FIG. 8 is a sectional side view of a second embodiment of a hand-held bar code scanner in which the optical transceiver deflects the scanning light beam through a limited rotation of the optical transceiver.

Referring now to FIG. 8, there is shown a second embodiment of a hand-held scanner generally indicated by the numeral 100 comprising an elongated body portion 102 having an angled front portion 104 with an transparent area 106 located therein. Mounted within the body portion is a motor 108 rotating a hollow drive shaft 110 which extends through the motor 108 and has mounted on its front end the optical transceiver 67 (FIG. 6). Positioned adjacent the rear end of the drive shaft 110 is a collimated and focusing lens member 112 which receives a laser light beam 114 from a laser diode 116. The lens member 112 will collimate and focus the received laser light beam 114 and project the collimated light beam through the hollow shaft member 110. The light beam 114 transmitted through the shaft member 110 will strike the inclined surface 69 of the transceiver 67 which deflects the light beam out through the opening 106 forming a single scan line 120 through which a coded label (not shown) is positioned.

The present invention includes the use of a number of Hall sensors 122 (FIG. 8) whose output signals are used to control the operation of the laser diode 116 to turn on the diode only during selected ranges of rotation of the motor 108. The Hall sensors may also be used to control the length of rotation of the motor 108 producing a dithering operation of the scanning unit which, when used with the turning mirrors 40 (FIG. 2) generates a series of parallel scan lines similar to the lines 123 shown in FIG. 10.

The light beams 124 (FIG. 8) reflected from the scanned bar code label (not shown) will be collected by the aspherical concave collection surface 63 of the optical transceiver 67 and directed at a mirrored surface 130, which surface deflects the received light beams at a photodetector 132 mounted on a support member 134. The support member 134 extends lengthwise of the body portion 102 to the rear portion of the body portion where a printed circuit board 136 containing the processing circuits of the scanning system is mounted. Mounted in the rear edge 138 of the body portion 102 is a plug member 140 within which is mounted one end of a cable 142 for supplying power to the printed circuit board 136 and for receiving signals from the processing circuits of the scanning unit for transmission to a remote processor for processing the electrical signals generated by the scanning operation. It is obvious that if the bar code scanner is to be truly portable, a rechargeable battery pack may be mounted within the handle portion of the scanners shown in FIGS. 7 and 8.

Figure 9A:
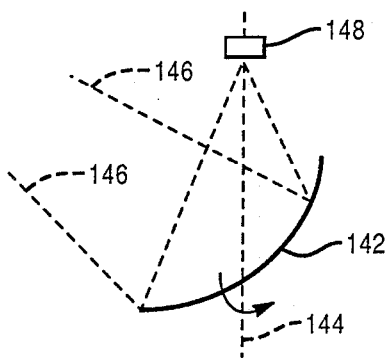
FIGS. 9A–9D inclusive show various optical arrangements for collecting on the spin axis the reflected light beams from a scanned bar code label and for directing the reflected light beams towards a photodetector.
Figure 9B:
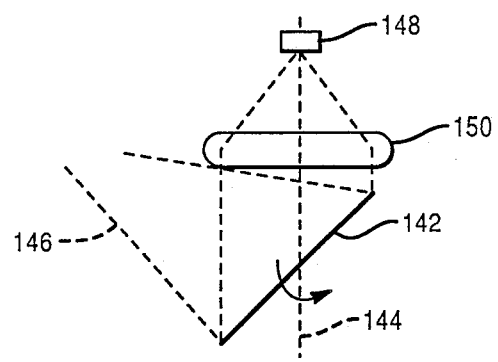
Figure 9C:
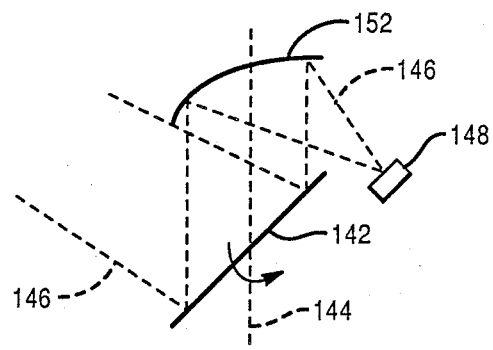
Figure 9D:
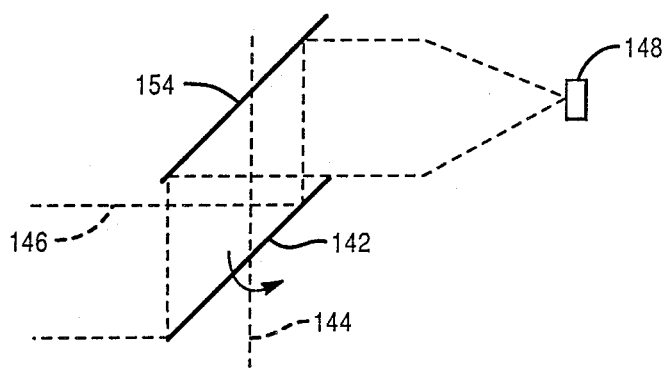

In FIGS. 9A-9D inclusive, there are shown a number of collection mirror-photodetector arrangements, which can be utilized to implement the present invention where the optical transceiver is mounted on the spin axis to collect the reflected light. As shown in FIG. 9A, the single element concave collection mirror 142 rotating about the spin axis 144 directs the received reflected light beams 146 at a photodetector 148, also located on the spin axis. In FIG. 9B, a lens member 150 is positioned on the spin axis 144 and receives the reflected light beams 146 from a rotating flat collection mirror 142, the lens member 150 focusing the received reflected light beams on photodetector 148 located on the spin axis. In FIG. 9C, a single deflecting mirror 152 mounted on the spin axis 144 for receiving the reflected light beams from the flat collection mirror 142 directs the reflected light beams 146 at the photodetector 148 which is mounted offset to the spin axis 144. In FIG. 9D, a flat collecting mirror 142 and a flat deflecting mirror 154 mounted on the spin axis 144 reflect the reflected light beams 146 to a photodetector 148 which is mounted offset to the spin axis 144.

Referring to FIGS. 10-12 inclusive, there are shown various scanning patterns generated by the scanning unit 20 (FIG. 1) of the present invention. In FIG. 10, the ring of mirrors 40 rotate while the transceiver 42 remains stationary thereby generating a plurality of parallel scan lines 123 comprising the scan pattern 125. In FIG. 11, the ring of mirrors 40 is stationary while the transceiver 42 is rotated 360 degrees generating the scan pattern 71. By utilizing the Hall sensors 122 (FIG. 8) in the manner previously described, actuation of the button 88 (FIG. 7) can select any single scan line of the scan pattern 71a to be generated. In FIG. 12, there is shown the mirror support member 38 having a ring of gear teeth 160 on its inside peripheral surface. A pinon gear member 162 engages the gear teeth 160 and engages a ring of gear teeth 164 secured to the drive shaft 28 resulting in the rotation of the mirror support member 38 in a direction which is opposite to the rotational movement of the drive shaft 28. The scan pattern 68 generated by the light beams 61 of this arrangement is shown in FIG. 12 and comprises a highly dense multiple line scan pattern which increases the efficiency of the scanning operation.

Figure 13:
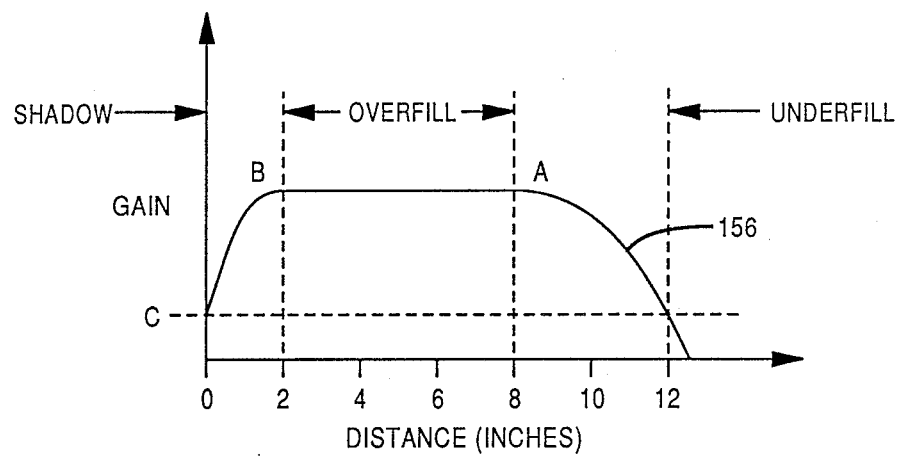
FIG. 13 is a diagram showing the amount of gain generated by the scanning unit of the present invention as the bar code label is moved relative to the bar code scanner.
Figure 14A:
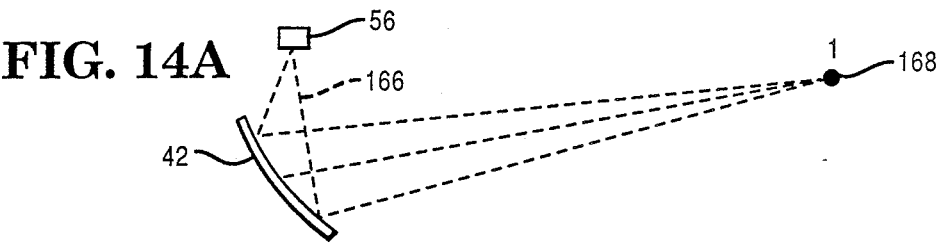
FIGS. 14A-14D inclusive are diagrams illustrating how the optical transceivers of the present invention provide the photodetector with a self-limiting dynamic range.
Figure 14B:
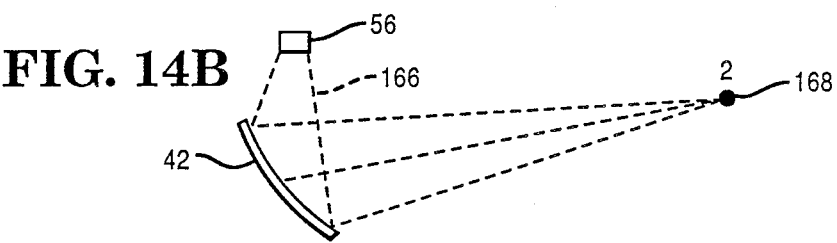
Figure 14C:
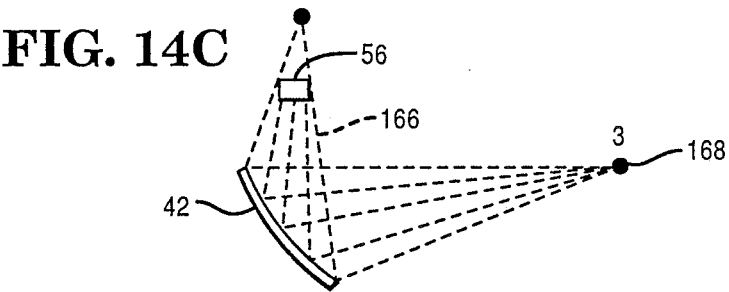
Figure 14D:
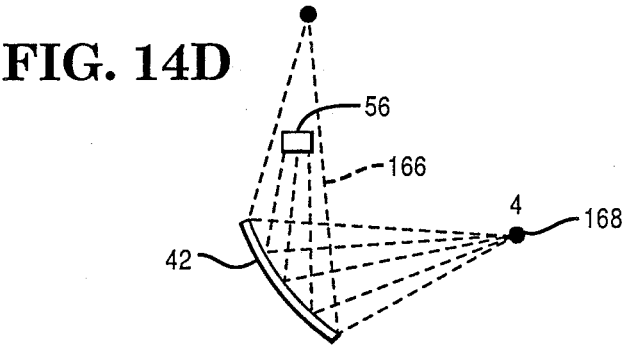

One advantage of the configuration of the optical transceivers of the present invention is that they provide an automatic dynamic range control of the light energy transmitted to the photodetector as the distance between the scanning unit and the bar code label is varied. As shown in FIG. 13, as the distance between the scanning unit and the bar code label decreases, the amount of reflected light received by the photodetector increases, resulting in an increase in the gain of the photodetector. This sequence is illustrated in FIGS. 14A-14D inclusive in which the point 168 represents the location of the coded label and also by the slope of the curve 156 (FIG. 13). As the distance decreases (FIGS. 14A and 14B), the output of the photodetector 56 will increase until it reaches point A on the curve 156. As the distance further decreases, the amount of light 166 reflected from the optical transceiver 42 will start to overfill the detector 56, thus limiting the amount of reflected light that is impinging on the photodetector. This condition is illustrated in FIG. 14C by moving the focal point of the reflected light beams at which the photodetector is located to a point 57 behind the photodetector 56, thus reducing the amount of light impinging on the photodetector 56. As the distance further decreases (FIG. 14D), the effect of the deflection mirror portion 44 of the transceiver 42 located in the aperture 64 (FIGS. 3 and 4) casting a shadow on the photodetector 56 will become evident thus reducing the gain as illustrated in the curve between points B and C.

Figure 15:
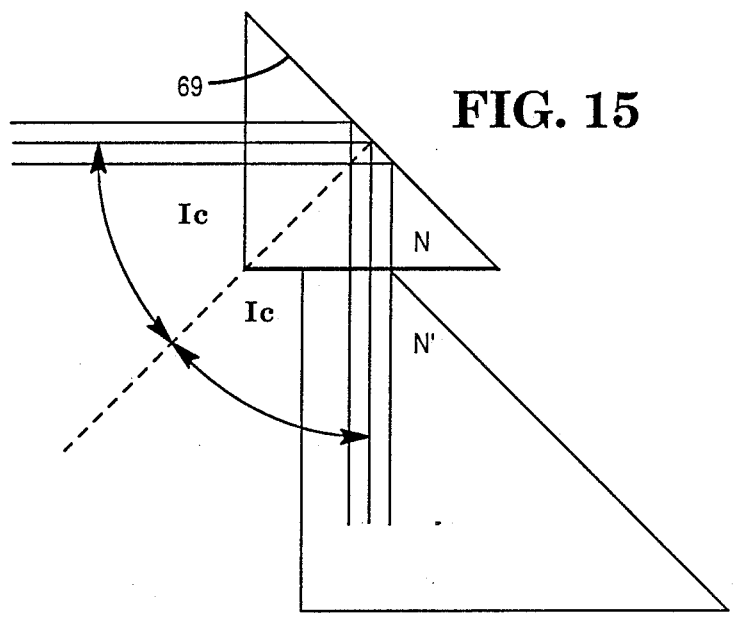
FIG. 15 is a diagram of an optical transceiver illustrating the path of the light beams as they strike the recessed internal deflecting surface of the optical transceiver of FIG. 8.

Referring now to FIG. 15, there is shown a diagram of the path of the light beams reflected off the recessed surface 69 of the optical transceiver 67 (FIGS. 6 and 8)) showing the total internal reflection of the light beams. The surface 69 deflects the received light beams at an angle of 90 degrees from the path of the received light beams when the angle of incidence (Ic) exceeds the arc sin of N/N' where N is the index of refraction of the low index material which in the present example is air and N' is the index of refraction of the incidence material which is the material from which the transceiver 67 is formed.

While the principles of the invention have now been made clear in an illustrated embodiment, it will be obvious to those skilled in the art that many modifications of structure, arrangements and components can be made which are particularly adapted for specific environments and operating requirements without departing from those principles. While there has been disclosed a mirror surface for collecting, deflecting and directing the light beams, it is obvious that other types of image forming surfaces may be used such as an optical prism, a diffraction surface forming a holographic image on a focal plane or any type of conic surfaces such as a parabolic surface. The appended claims are therefore intended to cover and embrace any such modifications, within the limits only of the true spirit and scope of the invention.

What is claimed is:

1. In a scanning system having a spin axis along which light beams are directed enroute to being projected upon and then reflected from coded indicia, a collector element located about the spin axis for collecting the light beams reflected from the coded indicia and directing them for interception in a direction upstream from the collector element along the spin axis.

2. The scanning system of claim 1 in which the collector element is rotatable about the spin axis.

3. The scanning system of claim 2 in which the collector element is rotated 360 degrees about the spin axis.

4. The scanning system of claim 1 in which the collector element is part of an optical transceiver having a deflector element for deflecting the light beams off the spin axis en route to being projected upon the coded indicia.

5. The scanning system of claim 1 which further comprises a hollow shaft which is rotated about the spin axis, whereby the light beams are directed through said shaft and along its axis of rotation en route to being projected upon the coded indicia.

6. The scanning system of 5 in which said shaft is the drive shaft of an electric motor.

7. The scanning system of claim 5 in which the collector element is mounted for rotation with said hollow shaft.

8. The scanning system of claim 7 in which the collector element is part of an optical transceiver having a deflector element for deflecting the light beams off the spin axis en route to being projected upon the coded indicia.

9. The scanning system of claim 1 which further comprises a light detector element for intercepting light beams reflected by the collector element and converting them to decodable signals.

10. The scanning system of claim 9 in which the light detector element is located on the spin axis.

11. The scanning system of claim 9 which further comprises deflecting means for intercepting and deflecting light beams reflected by the collector element to the light detector element, said deflecting means being located on the spin axis and said collector element being located on the spin axis.

12. The scanning system of claim 9 wherein the collector element comprises a concave, ellipsoidal mirrored surface for reflecting the light beams.

13. The scanning system of claim 12 wherein the light detector element is located at one of the ellipsoidal foci of the collector element along the major axis of said surface.

14. The scanning system of claim 13 which further comprises a plurality of forming elements located about the spin axis for reflecting the light beams and directing them en route to being projected upon the coded indicia, and for deflecting the light beams reflected from the coded indicia and directing them to the collector element.

15. The scanning system of claim 14 wherein each of said forming elements is of the same general size and shape, and the shape of said collector element corresponds to the shape of said forming elements.

16. The scanning system of claim 15 wherein the shape of said forming elements and said collector element is generally trapezoidal.

17. The scanning system of claim 14 wherein the optical center of said forming elements is generally located at the other end of said ellipsoidal foci along the major axis of said concave ellipsoidal mirrored surface when the collector element is aligned for receiving light beams from that forming element.

18. The scanning system of claim 14 wherein each forming element is generally located at the other of said ellipsoidal foci along the major axis of said concave, ellipsoidal mirrored surface when the collector element is aligned for receiving light beams from that forming element, and which further comprises a deflector element for deflecting the light beams off the spin axis and directing them at one of said forming elements for further deflection at said other of said ellipsoidal foci and projection upon the coded indicia.

19. The scanning system of claims 4, 8, 18 or 22 wherein said deflector element comprises a mirror located across and at an oblique angle to the spin axis, and mounted for rotation about said spin axis.

20. The scanning system of claims 4, 8, 18 or 22 wherein said deflector element comprises an optical prism.

21. The scanning system of claims 4, 8, 18 or 22 wherein said deflector element comprises a hologram.

22. The scanning system of claim 18 wherein said deflector element is located on said concave, ellipsoidal, mirrored surface on a minor ellipsoidal axis thereof.

23. The collection system of claim 22 wherein the distance between said ellipsoidal foci is about the length of the minor axis of said concave, ellipsoidal, mirrored surface.

24. The scanning system of claim 14 wherein each of said forming elements is a mirror.

25. The scanning system of claim 14 which includes eight forming elements for directing the light beams at the coded indicia.

26. The scanning system of claim 9 wherein the collector element comprises a concave, aspherical, mirrored surface for reflecting the light beams.

27. The scanning system of claim 26 wherein said surface is paraboloidal in shape and said detector element is located at the paraboloidal focus.

28. The scanning system of claim 27 which further comprises a deflector element for deflecting light beams off the spin axis and directing them generally parallel to the axis of symmetry of said mirrored surface; and a plurality of forming elements located about the spin axis for receiving light beams deflected by the deflector element and projecting them upon the coded indicia and for deflecting the light beams reflected from the coded indicia and directing them to the collector element in a direction generally parallel to said axis of symmetry.

29. The scanning system of claims 14–17 inclusive, 22, 23, 24 or 28 wherein the size of said collector element is about twice that of each of said forming elements.

30. The scanning system of claims 14–17 inclusive, 22, 23, 24, or 28 characterized by having a self-limiting dynamic range.

31. A scanning system for reading coded indicia by scanning with light beams characterized by a self-limiting dynamic range where the intensity of detected light beams reflected by the indicia remains generally constant over a range of working distances from the coded indicia, comprising a spin axis for generating light beams and a light detector element mounted on said spin axis for intercepting the light beams reflected by the indicia and converting the intercepted light beams to decodable signals, and a collector element mounted on said spin axis downstream form said light detector element for receiving the light beams reflected by the indicia and directing the received light beams for interception by the detector element, said collector element directing a lower percentage of said received light beams for interception by the detector element as the distance between the indicia and the collector element decreases.

32. The scanning system of claim 31 further comprising a one piece plastic structure for housing a drive motor having a hollow drive shaft mounted for rotation about the spin axis together with a replaceable diode and a collimating and focusing lens assembly for directing laser light along the spin axis through said shaft, said structure being adapted for said motor and assembly to be snap fitted in self-aligning relationship within said structure.

33. The scanning system of claim 32 further comprising a one-piece monolith of forming elements adapted to be fitted in self-aligning relationship within said structure so that said forming elements are located symmetrically about said spin axis.

34. The scanning system of claim 33 which further comprises a transparent plastic lens assembly which snap fits onto said structure and retains said forming elements in position, said lens assembly being adapted to transmit light beams directed to and from the coded indicia.

35. The scanning system of claim 34 wherein said lens assembly includes a housing for retaining the light detector element on the spin axis for intercepting light beams reflected from the coded indicia and for converting the intercepted light beams into decodable signals.

36. The scanning system of claim 35 in which said collector element is mounted for rotation about the spin axis on said hollow shaft to receive the light beams reflected from the coded indicia and transmitted through the lens assembly and to direct the received light beams for intercepting by said detector element.

37. The scanning system of claim 36 which further comprises a deflector element for deflecting light beams directed through said hollow shaft and directing them at said forming elements for further deflection through said lens assembly and projection upon the coded indicia.

38. The scanning system of claim 37 wherein said collector element and said deflector element comprise a one-piece plastic structure which snap fits onto said hollow shaft in self aligning relationship with said spin axis.

39. The scanning system of claim 38 adapted to receive light beams reflected from the coded indicia through the lens assembly and intercept the received light beams at the forming elements and direct the intercepted light beams for deflection by the collector element and interception by the detector detector element for conversion to decodable signals.

40. The scanning system of 39 in which said forming elements are mounted for rotation about the spin axis for projecting the light beams at the coded indicia in the form of a plurality of parallel scan lines extending in one direction when the hollow shaft is disabled for rotation.

41. The scanning system of claim 40 which further includes drive means interconnecting the drive shaft and the forming elements for rotating the forming elements in a direction opposite to the direction of rotation of the drive shaft for projecting the light beams at the coded indicia in the form of a plurality of parallel scan lines extending in all directions.

* * * * *